United States Patent [19]

Winiasz et al.

[11] 4,294,057
[45] Oct. 13, 1981

[54] CASE PACKER APPARATUS INCLUDING VELOCITY COMPENSATOR ASSEMBLY

[75] Inventors: Michael E. Winiasz; James M. Long, both of Lorain, Ohio

[73] Assignee: A-T-O, Inc., Willoughby, Ohio

[21] Appl. No.: 141,774

[22] Filed: Apr. 21, 1980

Related U.S. Application Data

[63] Continuation-in-part of Ser. No. 895,815, Apr. 12, 1978, Pat. No. 4,199,291.

[51] Int. Cl.³ ............................................. B65B 21/12
[52] U.S. Cl. ........................................ 53/244; 53/247; 53/251
[58] Field of Search ................ 414/416; 198/479, 798, 198/800; 53/244, 247, 251; 141/168

[56] References Cited

U.S. PATENT DOCUMENTS

| | | | |
|---|---|---|---|
| 3,938,847 | 2/1976 | Peyton | 414/416 X |
| 3,951,285 | 4/1976 | Barker | 414/416 |
| 4,106,612 | 8/1978 | Koerner | 414/416 X |
| 4,215,967 | 8/1980 | McGill et al. | 414/416 |

*Primary Examiner*—James L. Rowland
*Attorney, Agent, or Firm*—Oldham, Oldham, Hudak & Weber CO.

[57] ABSTRACT

Article packing or unpacking apparatus, including two correlated driven conveyors, the first for articles and the second for moving cases through a fixed course having a horizontal section and with both conveyors having fixed orbits, the article conveyor being in a vertical plane above the horizontal section of the second conveyor; and article grippers are positioned by carrier bars engaged with the article conveyor, which grippers depend from the carrier bars in a lower reach of such article conveyor. A pair of control arms are individually secured to each carrier bar at different ends thereof to engage guides as the article conveyor is moved downwardly towards an inflection area so that the article grippers are presented on vertical axes as they are moved into, along with cases moving through the horizontal section of the case conveyor fixed course. The articles are deposited in a case, and the guides and control arms move the article grippers up away from the case with continued downstream movement of the conveyors.

7 Claims, 5 Drawing Figures

CASE PACKER APPARATUS INCLUDING VELOCITY COMPENSATOR ASSEMBLY

This is a continuation-in-part of our prior application Ser. No. 895,815, filed Apr. 12, 1978, now U.S. Pat. No. 4,199,291.

BACKGROUND OF THE INVENTION

The soft drink and beer industries, as well as other industries, process a very large number of bottles or other containers every day and bottle and article processing apparatus as made and sold commercially today must operate rapidly, safely and dependably in filling carrier cases completely with articles to be packaged therein and in removing all articles from filled cases that are being unloaded. The apparatus also should be readily adjustable to handle cases of different sizes. Efforts are continually being made to increase the speed of operation of article and bottle casing and uncasing apparatus and to improve the dependability and efficiency thereof. One U.S. Pat. No. 3,951,285, is designed to automatically lift containers, especially bottles, from moving cases and then to deposit them onto a second conveyor at a remote spot. This patent utilized a series of closely adjacent, self-operating grippers that are carried along an endless path above a moving case or cases that are to be emptied. The patented apparatus moves the grippers through a fixed orbit including a descending angular path approaching a bottom or inflection point for article engagement and change in direction of movement of the grippers to an upwardly inclined angle. The patent teaches that the speed of the chains moving the gripper jaws through an orbit in the vertical plane must be slightly greater than the speed of the conveyor controlling flow of filled cases through the apparatus so that there is a horizontal velocity component of the gripper jaw moving chains equal to the speed of movement of the case control conveyor.

Such prior patent utilizes a plurality of gripper fingers or means therein that are substantially longitudinally abutted in the control apparatus. The patent has no means adapted to position gripper members in positions correlated with the articles in a case to be loaded or unloaded.

The general object of the present invention is to provide an improved article caser apparatus; while specific objects are to provide article gripper means and controls therefor in article casers and the like wherein the article gripper means are arranged in groups corresponding to the articles to be positioned in or removed from the case whereby accurate alignment and article engagement action can be obtained; also to present apparatus to move the article gripper means through a controlled orbit and correlate the speed and positions of the gripper means at the inflection area with the cases being processed for best article deposit therein; and to control the positions of the gripper means by control arms and guide means operatively engaging the gripper means.

Another object of the invention is to mount gripper means on carrier bars extending transversely of the apparatus in fixed dependent angular relation thereto whereby the position of the gripper means in relation to the vertical can be controlled through the carrier bars that are operatively connected to driven control conveyors.

Other objects of the invention are to provide a pair of control arms engaging each gripper means carrier bar in the article processing apparatus whereby the carrier bar, that is pivotally positioned, can be controlled to make the article gripper means, positioned by the bar, be on a vertical axis while the carrier bar is moved towards, through and past the inflection area or point; to control the positions of carrier bars and the article gripper means positioned thereby through article engaging, deposit and/or release stations of the apparatus, but yet to permit merely a general control action of the carrier bars and the positioning thereof throughout the remaining portion of the closed orbit of the carrier bars as determined by their drive conveyor; to utilize mechanical guide bars requiring a minimum of maintenance thereon for effectively controlling the positions of gripper means in article casing and uncasing apparatus; to position certain pantograph members, drive chain means and guide rollers for carrier bars, on common axes, and to position the gripper carrier bars on axes radially internally of the conveyor orbit to aid in controlling the speed of movement of the article gripper means on the carrier bars at the inflection area or point in the apparatus; and to provide control movements of the gripper means by short downstream movement of the article conveyor.

One of the objects of the present invention is to adapt the velocity compensator apparatus of a case unpacker over to do a case packing action with minor modifications in the case unpacker apparatus and wherein similar members and apparatus are used throughout but with modifications being made thereto to achieve the different goals of the present invention.

Another object of the invention is to improve the dependability, speed and efficiency of article uncasing and casing apparatus.

The foregoing and other objects and advantages of the invention will be made more apparent as the specification proceeds.

Reference now is particularly directed to the accompanying drawings, wherein.

Figure 4:
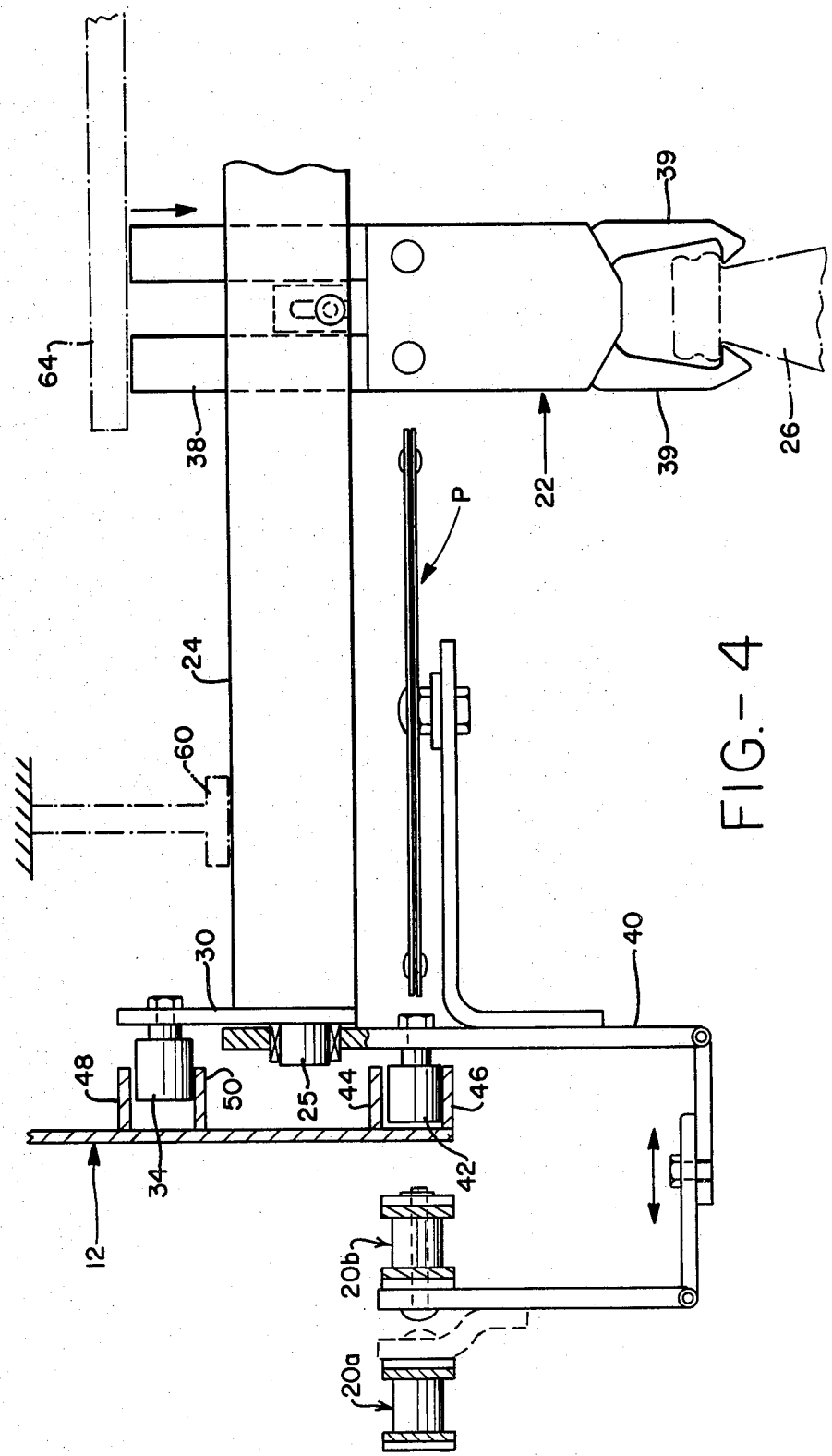
Figure 5:
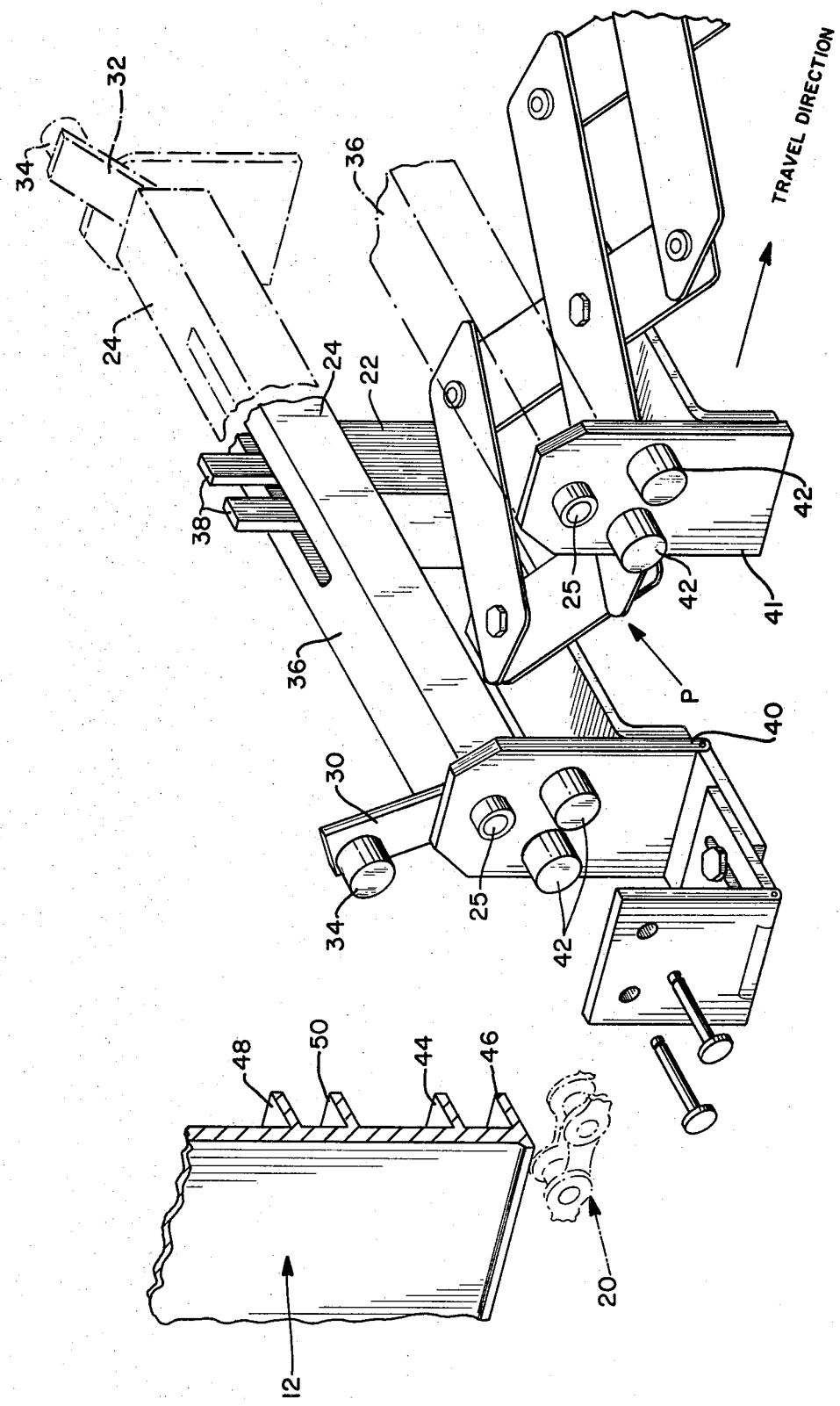

FIG. 4 is a fragmentary enlarged elevation, partially shown in vertical section, of a carrier bar and an article gripper jaw and associated mounting means and drive means therefor in the apparatus; and, FIG. 5 is a perspective view, partially shown in vertical section, of a portion of the apparatus particularly including a gripper jaw means, carrier bar and associated mounting members and the pantograph unit in the apparatus.

When referring to corresponding members shown in the drawings and referred to in the specification, corresponding numerals are used to facilitate comparison therebetween.

SUBJECT MATTER OF INVENTION

This invention, as one embodiment thereof, relates to a case packer including a frame, a driven case control conveyor for moving cases through a fixed course having a horizontal section, and a driven article conveyor means having a fixed orbit in a vertical plane, a part of the orbit being above the conveyor horizontal section, normally closed article gripper means, and carrier bars for the article gripper means operatively connected to and moved by the article conveyor means, the article gripper means normally depending from the carrier bars in fixed angular relation thereto; the apparatus normally including a pair of control arms for each of the carrier bars, which control arms are individually and fixedly secured to different ends of the carrier bars and extend therefrom in planes perpendicular to the longitudinal axis of the carrier bar, the driven article conveyor means having a course extending downwardly towards the horizontal section of the case conveyor course at an acute angle thereto and then rather sharply upwardly from an inflection area in the apparatus which is the area of release by the gripper means of an artical carried thereby to deposit it in a case on the driven conveyor, and a pair of longitudinally spaced guide means on the frame to individually engage one of the control arms as its said gripper carrier bar is moving towards a drive sprocket, a bottle engaging area, through a transfer section and into the inflection area and to engage the other control arm as the same said carrier bar moves upwardly from the inflection area, around a positioning sprocket and along a return path towards the drive sprocket, and short cam means at spaced portions of the article conveyor means to open the article gripper means temporarily for article engaging or release action.

REFERENCE APPLICATIONS AND DISCLOSURES

In the article packing or unpacking apparatus of the invention, preferably the case feed control means are of the type shown in our companion co-pending application Ser. No. 879,129, filed Feb. 21, 1978. The bottle gripping devices used in the invention can be of conventional type, but those shown in co-pending application Ser. No. 845,460, now U.S. Pat. No. 4,169,621, are preferred. We practice the present invention with a carrier bar and gripper jaw assembly and means as shown in and described in our copending application Ser. No. 879,128, filed Feb. 21, 1978, now U.S. Pat. No. 4,183,428. The details of construction and operation of the orbital conveyor forming the article carrying portion of the apparatus is of the type shown and described in more detail in U.S. Pat. No. 4,147,265 upon adjustable apparatus for case loading and unloading. The foregoing applications and patent are all assigned to A-T-O Inc.

One of the objects of the present invention is to adapt the velocity compensator apparatus of a case unpacker over to do a case packing action with minor modifications in the case unpacker apparatus and wherein similar members and apparatus are used throughout but with modifications being made thereto to achieve the different goals of the present invention.

GENERAL APPARATUS

Attention now is directed to the main components of the structure shown in the drawings, and an article unpacker is illustrated therein and is indicated as a whole by the numeral 10. Such article or case unpacker includes conventional frame means 12 and a driven case control conveyor 14 for moving cases 16 through a fixed course having a horizontal course or section 18 mounted on the apparatus frame. The conveyor 14, frame 12 and section 18 are indicated diagrammatically in FIG. 1, while the overall apparatus and frame means are shown diagrammatically in FIGS. 1 and 2 of the drawings. The frame means 12 include a fixed support unit for mounting the various components of the apparatus in operative relationship with each other. Such components include a second driven conveyor or article conveyor means 20 positioned above the conveyor horizontal section 18, as indicated best in FIG. 1. The article conveyor means operatively positions and moves a plurality of article gripper means 22 that are operatively secured to and positioned by carrier bars 24, FIG. 4, that extend transversely of the apparatus and particularly transversely of the orbit of the conveyor means 20 and the vertical plane defined thereby.

The article carrier conveyor means 20 is adapted to pick up suitable articles, such as bottles 26, that are to be positioned in the cases 16, from a horizontally extending article supply conveyor means 28. Such bottles 26 are carried to a second portion in the conveyor means orbit where an inflection area is provided and the conveyor means 20 and associated mechanism is adapted to deposit the articles 26 into the cases 16 on the conveyor 14 for transfer further processing as required.

The article gripper means 22 are adjustable in positions to adapt the apparatus to function with different sizes and types of cases 16. Groups of the article gripper means corresponding to the case article receiving spaces are present at suitably spaced portions longitudinally of the article conveyor 20.

APPARATUS DETAILS

Reference now is directed to FIGS. 4 and 5 wherein control arms 30 and 32 are shown together with other details of the apparatus associated with the carrier bars 24. These control arms 30 and 32 are fixedly secured to each individual carrier bar 24 at stub shafts 25 at opposite ends thereof and with the control arm 30 extending from the longitudinal axis of the carrier bar 24 at a rearwardly directed to the path of movement of the bar 24 and with the control arm 32 extending from the opposite end of the article carrier bar 24 in the opposite general direction at an obtuse angular relationship with the path of movement of the bar. Furthermore, these control arms normally lie in and define planes that are normal to the longitudinal axes of the carrier bars. Each control arm has an end guide or roller 34 jounalled thereon. The gripper carrier bars 24 normally have flat top surfaces 36 and upper end portions or control fingers 38 of the article gripper means protrude through these carrier bars. The grippers 23 are resiliently supported on the carrier bars, and the fingers 38 can be moved downwardly towards the carrier bars for controlling opening action of the normally closed article gripper fingers 39 provided at the bottom of the article gripper means. The carrier bars 24 are operatively positioned in the case unpacker 10 by members as described in our U.S. Pat. No. 4,147,265 and including dependent brackets 40 pivotally positioned on ends of the carrier bars and a pair of guides or rollers 42, 42 are journalled on the brackets 40 for being engaged between cam flanges 44 and 46. These cam flanges are suitably operably secured to the frame 12 to aid in controlling the fixed orbit through which the carrier bars 24 are moved by the article conveyor means 20. The conveyor means 20 comprise two different conveyors 20a and 20b all as described in more detail in our above identified patent. A second type of a bracket 41 engages the carrier bars 24 intermediate the ends of a case engaging group of such bars to mount if for drive through the orbit of the conveyor 20, the brackets 40 being present only at the ends of a case engaging group of the bars 24.

For the positive control action desired on the carrier bars 24 and gripper means 22 positioned thereby, these rollers 34 on the control arms 30 and 32 are shown engaged, FIG. 4, with a pair of cam tracks or guide means 48 and 50 that are operatively secured to the frame 12. These cam tracks vary in spaced relationship from the orbital axis of the control and drive conveyor means 20 for the articles being transported in the case packer, as later described.

Figure 1:
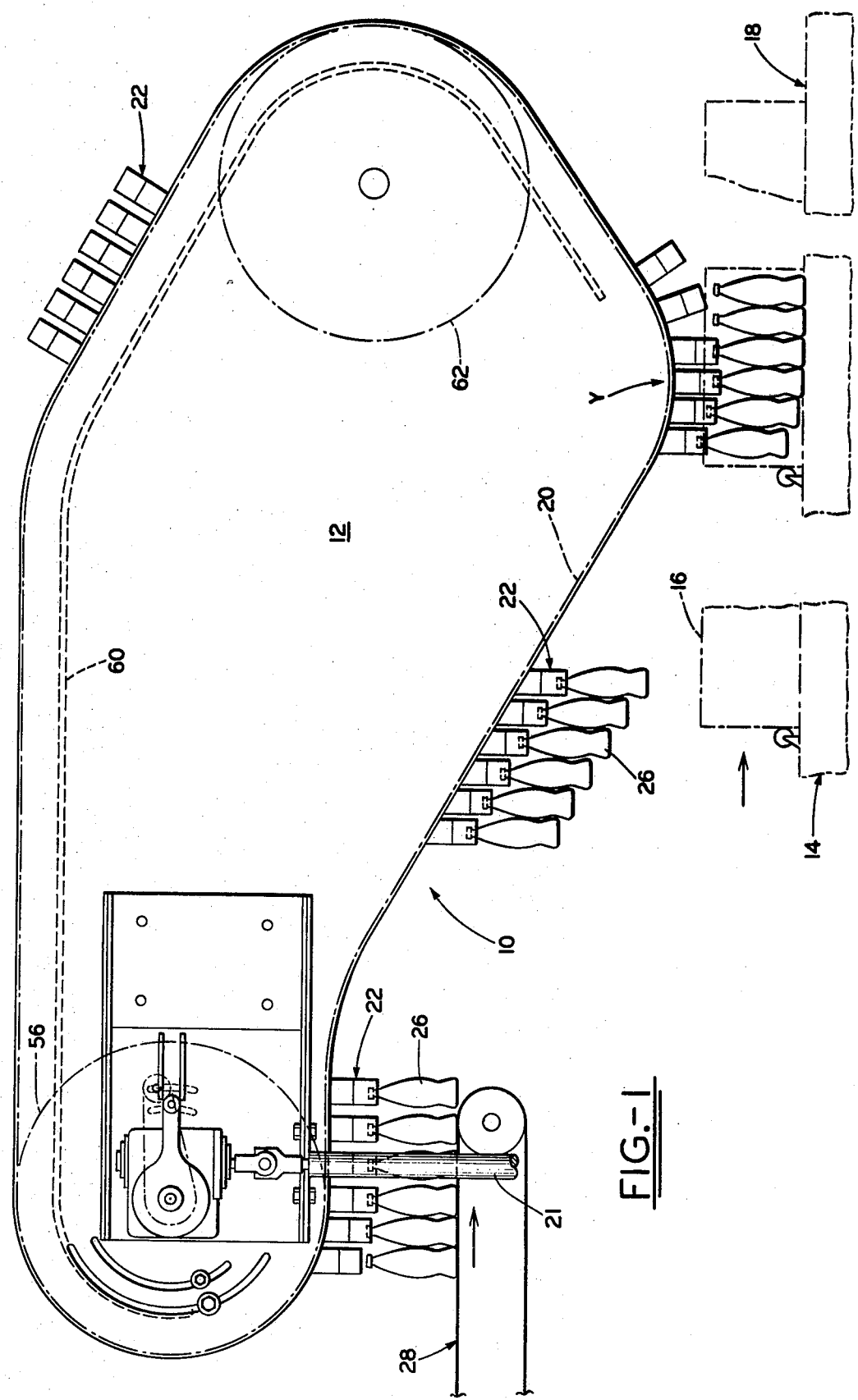
FIG. 1 is a diagrammatic view of article casing apparatus of the invention.
Figure 2:
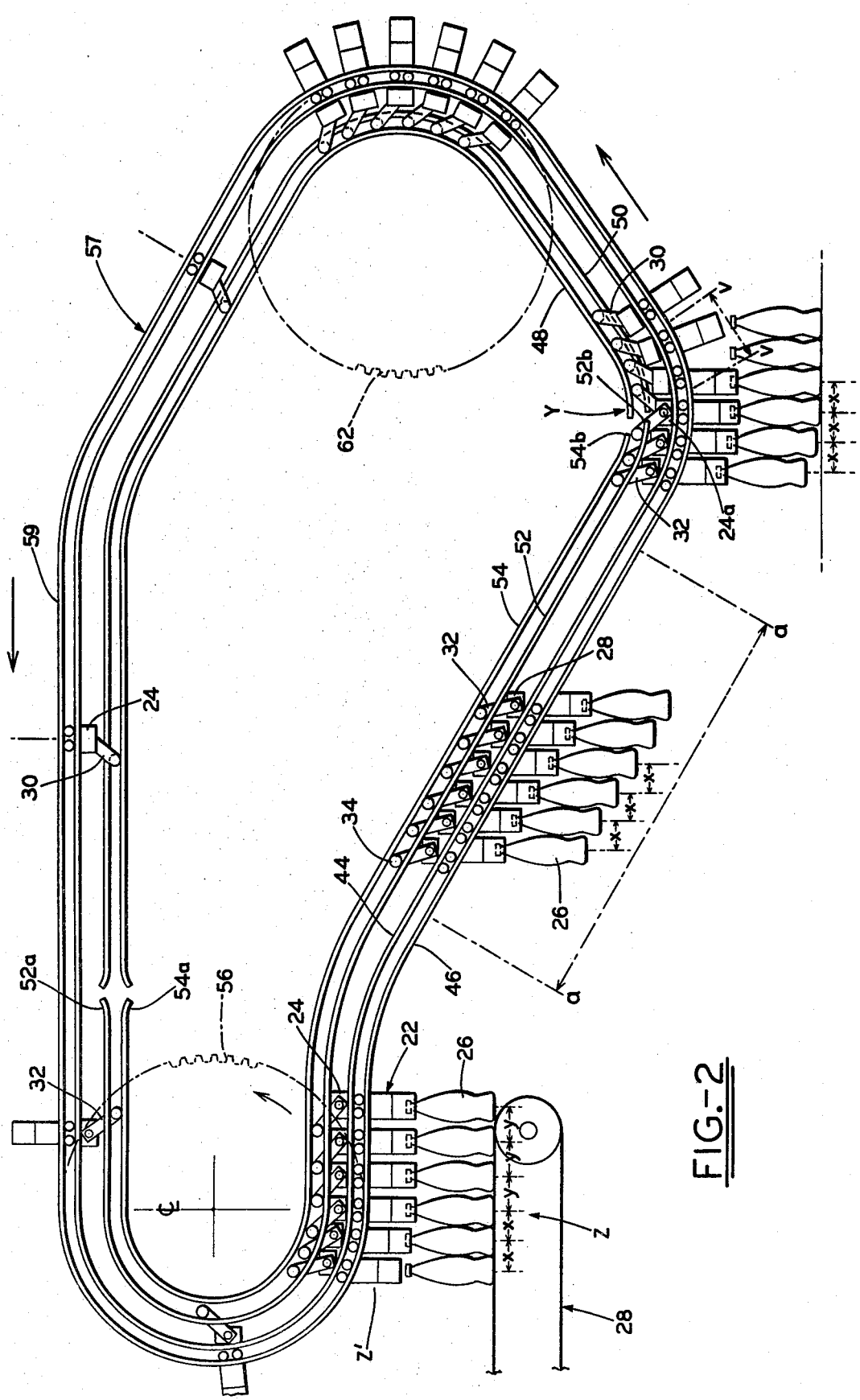
FIG. 2 is a diagrammatic side elevation of the article casing apparatus of FIG. 1 taken from the right hand side of cross bar assembly of FIG. 5 and showing the article gripper means being retained on vertical axes for article engagement and for article transfer and for deposit in cases at portions of the control conveyor orbit path.

FIG. 1 of the drawing indicates the orbit of the article conveyor means 20, while FIG. 2 better shows the pair of guide cam tracks 52 and 54 that engage the cam arms 32 to control the positions of the gripper bar units which have the gripper fingers depending therefrom as the cross bars are moved to and through article pick-up or deposit areas.

As the orbit of the conveyor means 20 is moved around the sprocket 56, its course changes from downwardly arcuate in approaching the conveyor 28 to parallel to the upper reach of the conveyor for article pick-up action. The center axis of the cam tracks 52 and 54 is positioned closer to the conveyor orbit, which is defined by the pairs of rollers 42, FIG. 4 engaging the tracks 44 and 46, as the cross bars 24 are moved towards and start around the sprocket 56 but then such center axis is gradually positioned slightly further away from the conveyor orbit to bring the cross bar 32 to a nearly vertical position at position Z' for the bar moving into position for article engagement.

The control arms, cross bar and its mounting and positioning means, FIGS. 4 and 5, are such that with the tracks 52 and 54, they position the gripper means on center line distances X as the bars move to and into pick-up position Z' to engage bottles at Z, distance X being the centerline distance apart of abutted bottles. Slightly closer positioning of the tracks 52 and 54 to the conveyor orbit immediately follows movement of the carrier bars past the vertical centerline of the drive sprocket to make the cam rollers 34 trail its cross bar more and space the articles 26 slightly further apart by a distance Y between the suspended article centerlines.

The articles are again on vertical axis as the cross bars move through the descending straight line path a-a of the conveyor means and into an inflection point or area at the lowest portion in the orbit of the article conveyor means 20. There the article deposit action in case 16 is obtained. FIG. 2 brings out that the track 52 is slightly longer than the track 54 so that the roller 34 on the control arm will remain in engagement with the cam track 52. The tracks 52 and 54 have entrance ends 52a and 54a at an upper return course of the means 20 and the arms are retained at a backwardly inclined angle as the cross bars 24 are moved to and around the drive sprocket 56. This holds the cross bar units firmly to prevent undesired non-controlled movement of the bars and gripper means for effective control in the angular relationship of the control arm 32 to the vertical and the spacing of the articles 26 as the carrier bar 24 to which it is secured is moved downwardly towards and into the inflection and deposit area y. Gradual pivotal movement of the arm 32 backwardly is produced by the cam tracks 52 and 54 adjacent their exit ends 52b and 54b which are slightly closer to the conveyor rollers 42 orbit and which space the articles 26 at distance X again, as the carrier bar is moved into the inflection area Y by the drive conveyors 20a and 20b. The gripper means 22 are on vertical axes as the carrier bars 24 are moved into the inflection area Y of the apparatus when the conveyor orbit changes smoothly to an upwardly extending straight line path.

At areas Z and Y the horizontal movement speed of the carrier bars 24 equals the speeds of the conveyors 28 and 14 respectively.

As a further feature in the design and construction of the guide and control means in the apparatus, a second pair of guide tracks or cam plates 48 and 50 are provided on the frame means in the ascending and return portions of the orbit of the conveyor means 20 after passing to the article drop and inflection area Y. At this time, the conveyor means 20 orbit has a flat arc section v-v and then it rises along a straight line conveyor path at an acute angle to the horizontal, and the opposite control arm 30 on the individual carrier bars engages these cam plates 48 and 50 and the other control arm on the bar has been released by the cam plates 52 and 54 as soon as the cam plates 48 and 50 engage the other arm. The cams 48 and 50 also have a short flat arc and then a straight line upwardly inclined path.

FIGS. 1 and 2 of the drawings best show how the arms 32, that are diagrammatically indicated as being on the far lateral side of the apparatus 10 of the invention, are at an angle extending upstream or backwardly of the orbital path of the article conveyor means 20 whereas the control arms 30 indicated as being on the near side of the apparatus from angles with the vertical that are extending generally downstream of the orbital path of the conveyor means 20. Frame means and associated members are omitted in FIGS. 1 and 2 to show the guide and position control members primarily. As the carrier bars are moved upwardly by the conveyor means 20 engaging a guide sprocket 62 and ultimately a drive sprocket 56, the orbit of the conveyor means 20 is controlled and an upwardly inclined return course 57 and connecting horizontal course 59 leads the conveyor back to its drive sprocket 56. The speed of movement of the individual gripper fingers and the conveyor orbit, controls and design are such so as to be moving the article gripper means 22 along a horizontal course at the same speed as the case conveyor 14 for smooth deposit of articles into the case and removal of the grippers 22 from the case 16.

It is very desirable to maintain the article gripper means 22 in relatively fixed, controlled positions as they are moved through the return portion of the orbit of the conveyor means 20. Hence, the cam tracks 48 and 50 extend up around sprocket 62, and course 57 to end in course 59 immediately adjacent the entrance ends of cam tracks 52 and 54 to hold the bars 24 fixedly by control arms 30 engaging the tracks 48 and 50.

A suitable guide, cam rail or the like 60 is fixedly positioned by the frame means 12 adjacent the flat upper surfaces of the carrier bars 24 and it can position guides to engage and control the lateral spacing of the gripper fingers on the carrier bars as they are moved through the upper return portion of the orbit of the conveyor means. Such guide 60, is only diagrammatically shown in FIG. 4 as it normally would be positioned at the centers of the carrier bars 24.

The conveyor means 20 are driven and/or adjusted in speed by members fully described and shown in our companion co-pending application Ser. No. 879,130, now U.S. Pat. No. 4,147,265, and including a drive shaft 21 operatively mounted on the frame.

The gripper jaws are opened when the fingers 38 are moved downwardly, but the spring return action (not shown) in the gripper means 22 moves the gripper means jaws and/or fingers 39 when released into article engaging or retaining positions.

Figure 3:
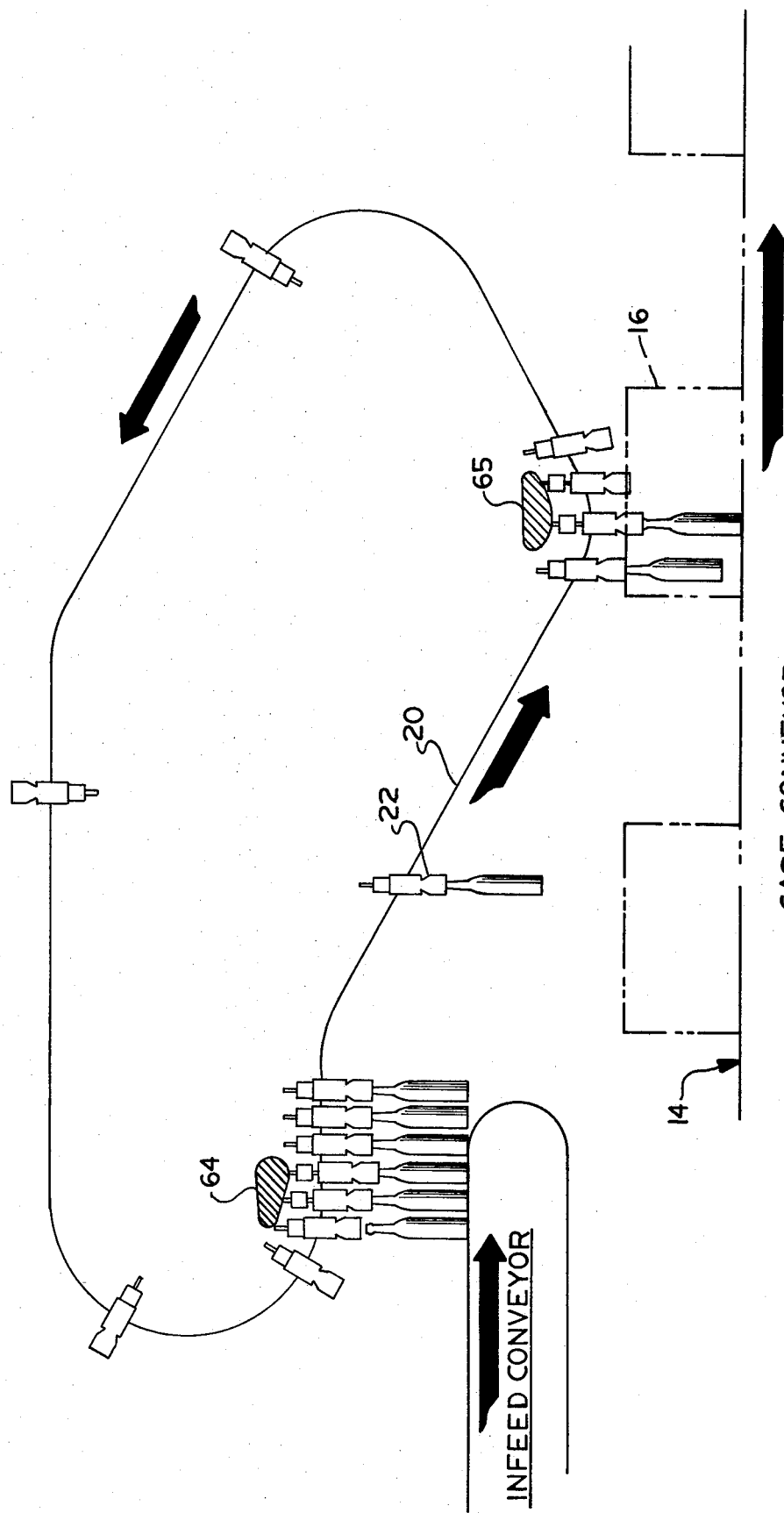
FIG. 3 is a diagrammatic view of the carrier bars, article gripper means, and control cams as present in or as moved through the article engaging area and to and through the article deposit inflection area of the article conveyor course.

So as to control article engaging and release action, suitable cams or means of known construction are provided in the apparatus 10 of the invention and are secured to the frame means 12. One typical control cam 64 is indicated in FIG. 3 to engage the upper ends of the fingers 38 as the individual carrier bars 24 are brought down towards the article pick-up area Z by the conveyor orbit to engage the cam, which is positioned above such area in the apparatus. Hence, as the gripper jaws are moved towards article engaging and pick-up positions at area Z, the jaws 39 are open by the cam 64 engaging the fingers 38, but the cam 64 soon terminates and the jaws are permitted to spring to a closed article engaging position. Such action occurs almost immediately as the gripper means moves past a vertically downwardly extending radius of the drive sprocket 56. Conveyor movement then carries the articles downwardly for deposit in the associated carrier cases 16, the gripper means being maintained on vertical axes for such movement.

A similar cam 65 is provided above the article deposit area Y for engaging with the fingers 38 of the article gripper means to move the gripper jaws to article release (open) positions as these gripper means 22 and their carrier bars are moved to lower articles into cases upon the conveyor 14.

The cam tracks 44 and 46 of course are designed to provide the desired path for the closed loop orbit of the conveyor means 20.

It will be understood that the invention provides a positive, accurate control for the positioning of the article gripper means 22 in their depending relationship to the carrier bars 24 as such bars are moved into and through the inflection area or point in the apparatus wherein the gripper means and suspended articles have been lowered into (or aligned with) the cases for deposit of the articles therein as the conveyor 14 moves the cases along under the orbital path of the article conveyor means 20. A smooth unhampered deposit of the articles into the case is provided by the vertically maintained positions of the gripper means 22 as they approach the inflection area Y and as they move up and swing upstream from the inflection point.

So as to maintain complete operative control of the individual carrier bars at all times, the apparatus has the control arms 32 and flanges or cam tracks 52 and 54 positively controlling the exact pivotal position of the carrier bars 24 as they move downwardly towards and pass into the inflection area Y at the lowermost point in the orbit of the conveyor means. However, prior to such control arm 32 being released by its control cam tracks, the oppositely directed control arm 30, FIG. 1, has previously been brought into operative engagement with one or usually both of its cam tracks 48 and 50. Hence, at this one position, the carrier bar 24a at such position is retained against pivotal movement on its shafts 25 to maintain its gripper means on a fixed vertical axis for article release. Now as the lowermost gripper carrier bar 24a starts to be elevated in the apparatus, it will be controlled by this opposite control arm 30 and its cam tracks 48 and 50 to be quickly swung up and out of the adjacent case 16. It will be noted that the cam 65 is at the lowermost part of the course of the conveyor 20 as is the carrier bar 24a, FIG. 2, when both of its control arms 30 and 32 are engaged with their control cam tracks. The sets of cam tracks 48 and 50 and 52 and 54 both have adjacent entrance and exit ends that are substantially horizontally aligned.

FIG. 2 shows the progressive changes in relative positions of the control arms 30 and 32 to the carrier or support bars 24. In the apparatus, of course, the carrier bars 24 connect to the conveyor means in case filling sets spaced longitudinally of each other in the conveyor orbit. The bars 24 are of generally rectangular shape in vertical section and the gripper means can move on their vertical axes in relation to the mounting or carrier bar but cannot move in an arcuate direction centered on the bar axis so that a fixed carrier bar unit of the control arms, bars 24 and gripper means 22 is presented to the cases 16 for article pick-up and deposit.

As disclosed in detail in our copending application Ser. No. 879,128, now U.S. Pat. No. 4,183,428, the article gripper means 22 preferably are movable laterally of the individual carrier bars 24 and the lateral spacing of the gripper means can be suitably controlled, as desired, by rail 60 or means positioned thereby.

It should be noted that by having the center lines of movement of the carrier bars 24 be internal of the enclosed orbit of the article conveyor means 20 and associated positioning members, this moves the gripper means 22 slightly farther apart from each other when the article drive and control conveyor means 20 is moving down into, through and around the inflection point or area Y of the apparatus. This facilitates entry of the bottles and grippers into the associated cases and release of the bottles or articles. It also should be seen that the velocity of the chain conveyors 20 is constant and that the velocity of the carrier bars 24 is less than that of the conveyors 20 at the inflection area. But the carrier bars have a horizontal velocity at the inflection area substantially equal to that of the case control conveyor 14.

It should be appreciated that any reasonable angular relationships can be provided between the straight downwardly inclined path of the conveyor means 20 in relation to a horizontal plane. In all instances, the relative speeds of the case drive and control conveyor 14 and the article conveyor 20 must be correlated in such a manner that the horizontal movement of the individual carrier bars 24 and the article gripper means 22 thereon as moved through the inflection and deposit area Y of the apparatus is substantially or almost exactly the same as that of the cases being controlled and moved through the apparatus by the case conveyor 14.

All of the carrier bars 24 are driven by the conveyor means even if not directly secured thereto, as the pantograph means P form units of a plurality of a carrier bars 24 that have mounting and drive means, as shown in FIGS. 4 and 5, also provided at the other end of the set of bars forming a case filling unit. It will be realized that the brackets 40 are at each end of a pantograph unit and attach to individual conveyors 20a or 20b as indicated in FIG. 4.

From the foregoing, it is believed that the apparatus of the invention provides an effective, positive mechanical control for maintaining the article gripper means 22 and the actual gripper fingers or jaws in controlled operative positions in the apparatus. This is provided by the relationship between the carrier bars 24, control arms 30 and 32 (and their cam tracks), brackets 40 and 41, rollers 42, 42 and the relationship of the conveyor means 20 and the longitudinal axes of the rollers 42 in relationship of the conveyor means 20 and the longitudinal axes of the rollers 42 in relationship to the normal operative plane of the pantograph means P used for connecting a plurality of the carrier bars into a case engaging or filling set of carrier bars. Hence, we assemble the gripper finger means into sets or groups corresponding to the groups of articles in the cases to be processed.

A suitable drive means (not shown) operably engages the case control and supply conveyor 14 to drive it at a fixed speed slower than the speed of movement of the driven conveyor means 20. Drive member 21 operably connects to the driven conveyor means 20 for driving it at the faster speed correlated with the speed of movement of the conveyor 14.

What is claimed is:

1. In a case packer apparatus including a frame, a driven conveyor for moving empty cases through a fixed course having a horizontal section, said cases being moved at a fixed speed in said horizontal section, and a driven conveyor means having a fixed, closed orbit positioned in a vertical plane above said conveyor horizontal section, said conveyor means being driven at a greater speed than said fixed speed, a drive sprocket and a guide sprocket for said driven conveyor means, article gripper means, and carrier bars for said article gripper means operatively connected to and movable with said conveyor means, a driven article supply conveyor positioned below said driven sprocket, a pair of control arms for each said carrier bar individually fixedly secured to different ends of said carrier bar, to form carrier bar units, said driven conveyor means having a course extending downwardly towards said horizontal section at an acute angle thereto and then upwardly from an inflection area or zone at an acute angle thereto, said inflection area being the area of transfer of an article in relation to said driven conveyor and said conveyor means, and characterized by pairs of longitudinally spaced first guide means and second guide means on said frame to engage one of said control arms and control the angular relationship of said carrier bars and gripper fingers to the axis of said conveyor means as the carrier bar units are descending towards and into said inflection area and to engage the other of said control arms as its carrier bar moves away from said inflection area, said guide means each having an entrance end and an exit end, and said guide means operatively extending around the orbit of said driven conveyor means and being varied in spaced from such orbit to vary the positions of said gripper means in relation to a vertical axis.

2. In case packer apparatus as in claim 1, said first guide means operatively engaging said control arms and carrier bars and to retain the gripper means depending therefrom in fixed vertical positions with articles depending from such gripper means being abutted.

3. In a case packer as in claims 1 or 2 where said first guide means are positioned to extend closer to said conveyor means orbit past the centerline of the drive sprocket to move gripped articles apart slightly, said second guide means controlling said carrier bar units as moved around said guide sprocket.

4. In case packer apparatus as in claim 2, where said first guide means engaging a control arm of each carrier bar unit as such unit is moved around said drive sprocket for bringing said article gripper means to dependent vertical axis positions for pick-up of articles from said article supply conveyor, and for positioning said article gripper means on a vertical axis for lowering an article engaged thereby into a case on said horizontal section, and said second guide means being inclined upwardly to pivot said gripper finger means in an upstream direction to positions out of an associated case, articles engaged by said gripper means being released at said inflection area.

5. In a case packer apparatus including a frame, a driven conveyor for moving empty cases through a fixed course having a horizontal section, said cases being moved at a fixed speed in said horizontal section, and a driven conveyor means having a fixed, closed orbit positioned in a vertical plane above said conveyor horizontal section, said conveyor means being driven at a greater speed than said fixed speed, a drive sprocket and a guide sprocket for said driven conveyor means, article gripper means, and carrier bars for said article gripper means operatively connected to and movable with said conveyor means, a driven article supply conveyor positioned below said driven sprocket, a pair of control arms for each said carrier bar individually fixedly secured to different ends of said carrier bar to form carrier bar units, said driven conveyor means having a course extending downwardly towards said horizontal section at an acute angle thereto and then upwardly from an inflection area or zone at an acute angle thereto, said inflection area being the area of transfer of an article in relation to said driven conveyor and said conveyor means, and pairs of longitudinally spaced first guide means and second guide means on said frame to engage one of said control arms and control the angular relationship of said carrier bars and gripper fingers to the axis of said conveyor means as the carrier bar units are descending towards and into said inflection area and to engage the other of said control arms as its carrier bar moves away from said inflection area, said guide means each having an entrance end and an exit end, and characterized by said first guide means engaging a control arm of each carrier bar unit as such unit is moved around said drive sprocket for bringing said article gripper means to dependent vertical axis positions for pick-up of articles from said article supply conveyor, and for positioning said article gripper means on a vertical axis for lowering an article engaged thereby into a case on said horizontal section, and said second guide means being inclined upwardly to pivot said gripper finger means in an upstream direction to positions out of an associated case, articles engaged by said gripper means being released at said inflection area.

6. In case packer apparatus as in claim 5, said second guide means engaging said carrier bars and retaining them and the gripper means extending therefrom in fixed positions extending normally from the orbit of movement of said driven conveyor means.

7. In a case packer as in claim 5, where the exit end of said first guide means is is spaced upstream a short distance from the entrance end of said second guide means, and said ends of said guide means are in substantial horizontal alignment, and said second guide means extends to a position in said driven conveyor means orbit adjacent an entrance end of said first guide means, said second guide means controlling said carrier bar units as moved around said guide sprocket.

* * * * *